United States Patent [19]
Whitens

[11] Patent Number: 5,372,382
[45] Date of Patent: Dec. 13, 1994

[54] SEAT BELT WEBBING GUIDE ASSEMBLY

[75] Inventor: Michael J. Whitens, Dearborn, Mich.

[73] Assignee: Ford Motor Company, Dearborn, Mich.

[21] Appl. No.: 44,681

[22] Filed: Apr. 12, 1993

[51] Int. Cl.$^5$ .............................................. B60R 22/00
[52] U.S. Cl. ................... 280/808; 297/483; 411/510
[58] Field of Search ............... 280/801 R, 808, 801.1; 297/468, 483; 411/510, 174, 175; 403/380, 375, 341; 242/107, 76; 248/224.4; 24/639, 640, 163 R

[56] References Cited

U.S. PATENT DOCUMENTS

| | | |
|---|---|---|
| 3,080,634 | 9/1960 | Lindblad . |
| 3,127,652 | 4/1962 | Springer . |
| 3,244,057 | 4/1966 | Mathison ............................. 411/510 |
| 3,483,787 | 12/1969 | Saunders ............................. 411/510 |
| 3,494,244 | 2/1970 | Wayland ............................. 411/510 |
| 3,860,999 | 1/1975 | Meyer ................................. 411/510 |
| 4,582,840 | 4/1986 | Föhl ..................................... 280/808 |
| 4,611,825 | 9/1986 | Patterson ......................... 280/801 A |
| 4,909,541 | 3/1990 | Tokugawa ....................... 280/801 A |
| 4,973,084 | 11/1990 | Biller ................................ 280/801 A |
| 5,037,135 | 8/1991 | Kotikovsky et al. . |
| 5,054,815 | 10/1991 | Gavagan . |
| 5,096,224 | 3/1992 | Murakami et al. . |

*Primary Examiner*—Karin L. Tyson
*Attorney, Agent, or Firm*—Daniel M. Stock; Roger L. May

[57] ABSTRACT

A seat belt webbing guide assembly includes a plate disposed adjacent one side of vehicle structure and having an aperture through which belt webbing extends. The seat belt webbing guide assembly also includes a fastener securing the plate to the vehicle structure. The plate includes a structure cooperating with the vehicle structure to orientate and secure the plate about the fastener relative to the vehicle structure.

20 Claims, 1 Drawing Sheet

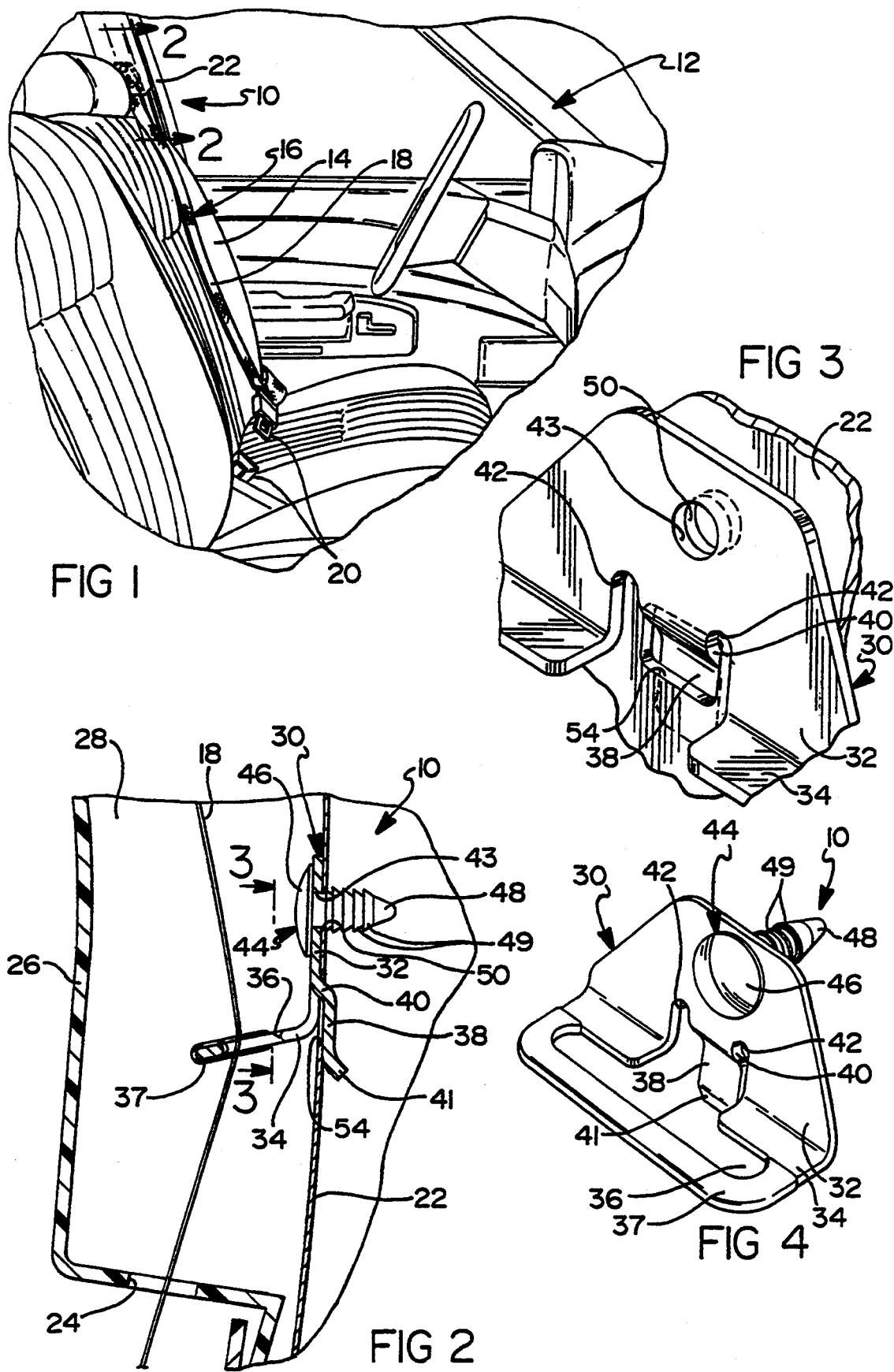

SEAT BELT WEBBING GUIDE ASSEMBLY

BACKGROUND OF THE INVENTION

1. Field of the Invention

The present invention relates generally to seat belt systems for vehicles and, more specifically to, a seat belt webbing guide assembly for a seat belt system on a vehicle.

2. Description of the Related Art

It is known to construct seat belt systems for vehicles to restrain forward movement of a vehicle occupant in the event of a sudden vehicle deceleration. It is also known to construct a seat belt webbing guide for the seat belt system to guide a length of belt webbing. Typically, the seat belt webbing guide includes a plate having an aperture through which the webbing can extend. The plate is typically secured to vehicle structure by a pair of structural fasteners such as sheet metal screws. While this approach securely anchors the plate to vehicle structure, it suffers from the disadvantage that the seat belt webbing guide requires structural fasteners with a high tensile retention capability (e.g., greater than one hundred pounds) to prevent separation of the plate from vehicle structure. Another disadvantage of the seat belt webbing guide is that the structural fasteners are installed on vehicle structure with the aid of a specialized tool. A further disadvantage of the seat belt webbing guide is that the structural fasteners add additional cost in both parts and assembly.

SUMMARY OF THE INVENTION

Accordingly, the present invention is a seat belt webbing guide assembly including a plate disposed adjacent vehicle structure and having an aperture through which belt webbing extends. The seat belt webbing guide assembly also includes a fastener securing the plate to the vehicle structure. The plate includes means for cooperating with the vehicle structure to orientate and secure the plate about the fastener relative to the vehicle structure.

One advantage of the present invention is that a seat belt webbing guide assembly is provided for a seat belt system on a vehicle. Another advantage of the present invention is that the seat belt webbing guide assembly includes a plate that has a hook or tab which cooperates with a slot in the vehicle structure to limit rotation of the seat belt webbing guide assembly. Yet another advantage of the present invention is that the tab and slot cooperate to provide a predetermined orientation of the plate relative to vehicle. Still another advantage of the present invention is that the seat belt webbing guide assembly has a plate that may be used with a non-structural, plastic fastener. A further advantage of the present invention is that the seat belt webbing guide assembly can be assembled or installed without the aid of any specialized tool. A still further advantage of the present invention is that the seat belt webbing guide assembly provides a substantial cost savings in both parts and assembly.

Other features and advantages of the present invention will be readily appreciated as the same becomes better understood after reading the subsequent description taken in conjunction with the accompanying drawings.

BRIEF DESCRIPTION OF THE DRAWINGS

FIG. 1 is a perspective view of a seat belt webbing guide assembly, according to the present invention, illustrated in operational relationship on a vehicle.

FIG. 2 is a sectional view taken along line 2—2 of FIG. 1.

FIG. 3 is a perspective view taken along line 3—3 of FIG. 2 with a fastener removed.

FIG. 4 is a perspective view of the seat belt webbing guide assembly of FIG. 1.

DESCRIPTION OF THE PREFERRED EMBODIMENTS(S)

Referring to the drawings and in particular FIG. 1 thereof, a seat belt webbing guide assembly 10, according to the present invention, is illustrated in operational relationship on a vehicle 12 (partially shown) such as an automotive vehicle. The vehicle 12 includes a seat 14 for supporting an occupant (not shown) in an interior or occupant compartment of the vehicle 12. The vehicle 12 also includes vehicle structure such as a vehicle floor pan (not shown) to support the seat 14. The vehicle 12 further includes a seat belt system, generally indicated at 16, for restraining an occupant in the seat 14.

The seat belt system 16 includes a belt 18 of webbing material or the like having one end attached to a belt anchor assembly (not shown) which is secured by suitable means such as a fastener (not shown) to the vehicle floor pan. The seat belt system 16 also includes a buckle assembly 20, one part of which is secured to the vehicle floor pan by suitable means such as a fastener (not shown). It should be appreciated that the belt 18 extends through another part of the buckle assembly 20 in a known manner.

The seat belt system 16 also includes the seat belt webbing guide assembly 10 attached to vehicle structure such as a vehicle body side inner panel 22. The belt 18 extends through the seat belt webbing guide assembly 10 to be described and may be routed through an aperture 24 in an interior panel 26 which is attached by suitable means (not shown) to the inner panel 22 to form a space 28 there between. The seat belt system 16 may include a retractor assembly (not shown) secured to the vehicle floor pan to retract and extend the belt 18. It should be appreciated that the belt 18 is attached to the retractor assembly in a known manner. It should also be appreciated that the seat belt system 16 is a continuous loop three (3) point active seat belt system which is known in the art.

Referring to FIGS. 2 through 4, the seat belt webbing guide assembly 10 includes a plate, generally indicated at 30, disposed adjacent the inner panel 22. The plate 30 has a base portion 32 extending axially and an inclined portion 34 extending at an angle from the base portion 32. The inclined portion 34 has a first aperture 36 extending therethrough. The belt 18 extends through the aperture 36. The inclined portion 34 may include a cover 37 such as a plastic coating over a portion thereof to reduce friction between the belt 18 and the plate 30.

The base portion 32 also includes a hook or a tab 38 extending axially for a function to be described. The tab 38 is connected to the base portion 32 via a stepped portion 40 which extends at an angle from the base portion 32. The tab 38 also has an end portion 41 extending at an angle from a free end thereof. The base portion 32 includes a pair of slots 42 spaced laterally and extending inwardly such that the tab 38 is disposed between the slots 42. The base portion 32 further includes a second aperture 43 and extending therethrough. It should be appreciated that the tab 38 is integral with the base portion 32.

The seat belt webbing guide assembly 10 also includes a fastener, generally indicated at 44, to secure the plate 30 to the inner panel 22. The fastener 44 has a head 46 disposed on a side of the base portion 32 and a shaft 48 extending therefrom. The shaft 48 has a plurality of fins 49 extending radially and spaced axially to from a retrorse fin configuration. The fastener 44 is of a standard type known in the art. The shaft 48 extends through an aperture 50 in the inner panel 22 and the second aperture 43 in the plate 30. The fins 49 have a diameter greater than a diameter of the apertures 43, 50 and flex radially upon insertion into the apertures 43, 50 and flex outwardly once past the aperture 50. The fastener 44 is a non-structural fastener made of a plastic material such as nylon and has a tensile retention capability of less than one hundred (100) pounds. It should be appreciated that the seat belt webbing guide assembly 10 may be attached to other vehicle structure such as a side sill member, quarter panel, etc.

The seat belt webbing guide assembly 10 includes an aperture or slot 54 in the inner panel 22 and located in a predetermined position relative to the aperture 50. The slot 54 is generally rectangular in shape. The tab 38 of the plate 30 extends into the slot 54. The tab 38 cooperates with the slot 54 to orientate the plate 30 relative to the aperture 50 in the inner panel 22. The slot 54 extends laterally a predetermined distance and cooperates with the tab 38 to limit rotation of the plate 30 about the fastener 44 to a predetermined amount such as ten degrees (10°) on either side of a plane extending between centerlines of the aperture 50 and slot 54.

In operation, the belt 18 is extended through the aperture 36 of the plate 30. The plate 30 is disposed adjacent one side of the inner panel 22 such that the tab 38 extends through the slot 54 and is disposed adjacent the other side of the inner panel 22. The stepped portion 40 preferably abuts an edge of the slot 54 and the second aperture 43 is aligned with the aperture 50. The shaft 48 of the fastener 44 is extended through the apertures 43, 50 by an operator's hand and the fins 49 flex and expand to sandwich the plate 30 to the inner panel 22 between the head 46 and shaft 48. The abutment between the stepped portion 40 and edge of the slot 54 limits axial movement of the plate 38 and axial loading on the fastener 44. It should be appreciated that the fastener 44 is substantially loaded only along its longitudinal axis during operation.

Accordingly, the seat belt webbing guide assembly 10 limits rotation of the plate 30 about the fastener 44 by engagement between the tab 38 and the sides of the slot 54. The tab 38 and slot 54 also provide a predetermined orientation to the plate 30 relative to the fastener 44 and inner panel 22. The tab 38 is integral with the base portion 32 and cooperates with the inner panel 22 to sustain tensile loads greater than seven hundred (700) pounds without separation from the vehicle structure.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A seat belt webbing guide assembly, comprising:
    a plate disposed adjacent one side of vehicle structure and having a first aperture through which belt webbing extends;
    a fastener securing said plate to the vehicle structure; and
    said plate including means extending therefrom for cooperating with an opposite side of the vehicle structure to orientate and secure said plate about said fastener relative to the vehicle structure.

2. A seat belt webbing guide assembly as set forth in claim 1 wherein said cooperating means comprises a tab extending from said plate and engaging a slot in the vehicle structure.

3. A seat belt webbing guide assembly as set forth in claim 2 wherein said fastener has a shaft and a head portion.

4. A seat belt webbing guide assembly as set forth in claim 3 wherein said fastener is made from a plastic material.

5. A seat belt webbing guide assembly as set forth in claim 4 wherein said plastic material is nylon.

6. A seat belt webbing guide assembly as set forth in claim 3 wherein said shaft has a plurality of fins extending radially and spaced axially to form a retrorse fin configuration.

7. A seat belt webbing guide assembly as set forth in claim 2 wherein said plate has a base portion extending axially and an inclined portion extending at an angle from said base portion.

8. A seat belt webbing guide assembly comprising:
    a plate disposed adjacent vehicle structure and having a first aperture through which belt webbing extends;
    a fastener securing said plate to the vehicle structure;
    said plate including means for cooperating with the vehicle structure to orientate and secure said plate about said fastener relative to the vehicle structure;
    said cooperating means comprising a tab extending from said plate and engaging a slot in the vehicle structure;
    said plate having a base portion extending axially and an inclined portion extending at an angle from said base portion, said base portion having said tab extending axially and a pair of spaced slots extending inwardly axially, said tab being disposed between said slots.

9. A seat belt webbing guide assembly as set forth in claim 8 wherein said inclined portion includes said first aperture extending therethrough.

10. A seat belt webbing guide assembly as set forth in claim 7 wherein said base portion includes means forming a second aperture extending therethrough, said fastener extending through said second aperture.

11. A seat belt webbing guide assembly as set forth in claim 10 wherein said fastener has a head disposed on a side of said plate, and a shaft extending through an aperture in the vehicle structure and said second aperture.

12. A seat belt webbing guide assembly for guiding belt webbing relative to vehicle structure, comprising:
    a plate disposed adjacent one side of vehicle structure and having a first aperture through which belt webbing extends;

a fastener securing said plate to the vehicle structure; and said plate including a tab extending axially therefrom through a slot in the vehicle structure and disposed adjacent on an opposite side of the vehicle structure.

13. A seat belt webbing guide assembly as set forth in claim 12 wherein said plate has a base portion extending axially and an inclined portion extending at an angle from said base portion.

14. A seat belt webbing guide assembly for guiding belt webbing relative to vehicle structure, comprising:

plate disposed adjacent one side of vehicle structure and having a first aperture through which belt webbing extends;

a fastener securing said plate to the vehicle structure;

said plate including a tab extending through a slot in the vehicle structure and disposed adjacent on another side of the vehicle structure; and said plate having a base portion extending axially and an inclined portion extending at an angle from said base portion, said base portion having said tab extending axially and a pair of spaced slots extending inwardly axially, said tab being disposed between said slots.

15. A seat belt webbing guide assembly as set forth in claim 12 wherein said base portion includes a second aperture extending therethrough, said fastener extending through said second aperture.

16. A seat belt webbing guide assembly as set forth in claim 15 wherein said fastener has a head disposed on a side of said plate, and a shaft extending through an aperture in the vehicle structure and said second aperture.

17. A seat belt webbing guide assembly as set forth in claim 16 wherein said fastener is made of a non-structural material.

18. A seat belt webbing guide assembly as set forth in claim 17 wherein said non-structural material is plastic.

19. A seat belt webbing guide assembly as set forth in claim 15 wherein said shaft has a plurality of fins extending radially and axially spaced to form a retrorse fin configuration.

20. A seat belt webbing guide assembly, comprising:

a plate disposed adjacent one side of vehicle structure and having a first aperture through which belt webbing extends;

a non-structural fastener securing said plate to the vehicle structure;

said plate including a tab extending axially therefrom through a slot in the vehicle structure and disposed adjacent on the other side of the vehicle structure.

* * * * *